United States Patent
Näslund et al.

(10) Patent No.: US 10,740,478 B2
(45) Date of Patent: *Aug. 11, 2020

(54) PERFORMING AN OPERATION ON A DATA STORAGE

(71) Applicant: Telefonaktiebolaget LM Ericsson (PUBL), Stockholm (SE)

(72) Inventors: Mats Näslund, Bromma (SE); Christian Schaefer, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 264 days.

This patent is subject to a terminal disclaimer.

(21) Appl. No.: 15/664,969

(22) Filed: Jul. 31, 2017

(65) Prior Publication Data
US 2017/0329982 A1 Nov. 16, 2017

Related U.S. Application Data

(62) Division of application No. 14/915,861, filed as application No. PCT/SE2013/051042 on Sep. 9, 2013, now Pat. No. 9,754,118.

(51) Int. Cl.
*H04L 29/06* (2006.01)
*G06F 21/62* (2013.01)
*G06F 16/22* (2019.01)

(52) U.S. Cl.
CPC .............. *G06F 21/62* (2013.01); *G06F 16/22* (2019.01)

(58) Field of Classification Search
CPC ..... H04L 2209/60; H04L 63/08; H04L 63/06; H04L 9/0894
See application file for complete search history.

(56) References Cited

U.S. PATENT DOCUMENTS 6,724,893 B1 4/2004 Petro
8,472,627 B2 * 6/2013 Denning ............. H04L 63/0428
380/258

(Continued)

FOREIGN PATENT DOCUMENTS

JP 2006-345160 * 12/2006
JP 2006/345160 12/2006

OTHER PUBLICATIONS

European Search Report, EP 13 771 240.2-1870, dated Jul. 14, 2016, 5 pages.

(Continued)

*Primary Examiner* — Jason K Gee
(74) *Attorney, Agent, or Firm* — Sage Patent Group (57) ABSTRACT

A method of performing an operation on a data storage for storing data being encrypted with a key KD associated with an owner of the data is provided. The method includes deriving, for each authorized client Cj, a first key KCj and a second key KTj, providing the client Cj with the first key KCj, and providing a Trusted Third Party (TTP) with the second key KTj. The method further includes, at a Policy Enforcement Point, receiving a request for performing the operation on the data storage from a client Ck of the authorized clients, acquiring a first key KCk from the client Ck, acquiring a second key KTk from the TTP, deriving the key KD from the first key KCk and the second key KTk, and performing the operation on the data storage using the derived key KD. The disclosed trust model uses two-part secret sharing.

11 Claims, 8 Drawing Sheets

(56) References Cited

U.S. PATENT DOCUMENTS

2009/0235303 A1* 9/2009 Yamaoka ............... G06Q 30/02
                                                    725/31
2013/0007464 A1  1/2013 Madden
2014/0233740 A1* 8/2014 Niamut ................ H04L 9/3013
                                                   380/279

OTHER PUBLICATIONS

International Search Report, Application No. PCT/SE2013/051042, dated May 6, 2014.
Written Opinion of the International Searching Authority, Application No. PCT/SE2013/051042, dated May 6, 2014.
Blanquer, et al., "Enhancing Privacy and Authorization Control Scalability in the Grid Through Ontologies," IEEE Transactions on Information Technology in Biomedicine, vol. 13, No. 1, Jan. 2009, pp. 16-24.
Song, et al., "Practical Techniques for Searches on Encrypted Data," 2000 IEEE Symposium on Security and Privacy (S&P 2000), Berkeley, CA, May 14-17, 2000, pp. 44-55.
Wikipedia, the free encyclopedia, "Private Information Retrieval," Downloaded Feb. 27, 2016 from https://en.wikipedia.org/wiki/Private_information_retrieval, 4 pp.

* cited by examiner

PERFORMING AN OPERATION ON A DATA STORAGE

CROSS REFERENCE TO RELATED APPLICATION

This application is a divisional of U.S. patent application Ser. No. 14/915,861, filed on Mar. 1, 2016, entitled, "PERFORMING AN OPERATION ON A DATA STORE," which is a 35 U.S.C. § 371 national stage application of PCT International Application No. PCT/SE2013/051042, filed on Sep. 9, 2013, the disclosure and content of which is incorporated by reference herein in its entirety. The above-referenced PCT International Application was published in the English language as International Publication No. WO 2015/034407 A1 on Mar. 12, 2015.

TECHNICAL FIELD

The invention relates to methods of performing an operation on a data storage for storing data being encrypted with a key associated with an owner of the data, corresponding computer programs and computer program products, a corresponding Policy Enforcement Point (PEP), a corresponding Trusted Third Party (TTP), and a corresponding client device.

BACKGROUND

A Personal Data Vault (PDV) is a cloud, or network, based data storage where a user, or an agent acting on behalf of the user, can store data, such as files, documents, photos, medical journals, music, contact lists, presence information, and so forth. The stored data can subsequently be accessed by authorized clients, i.e., clients which have been granted access to the stored data. The clients may be other users of the data storage, a network operator, or a service provider of, e.g., a personalized service, or a data sharing service.

It is known to use policy languages, such as the eXtensible Access Control Markup Language (XACML), to describe how resources, e.g., data or information, are to be treated. Before a resource can be accessed by a client, it is checked if access is allowed by the policy.

In situations where the data storage provider, or an associated PEP, is not fully trusted to enforce access policy, encryption is a common solution. However, encryption has the disadvantage that the owner of the data has to be online in order to provide a client requesting access with a decryption key for the encrypted data. If the owner wants to grant offline access, the key has to be provided to the requesting client by some other means than storing the key in the data storage, since storing keys in the data storage defeats the trust model. Regardless how access to the key is implemented, the owner does not have full control and anyone being in possession of the key can access the stored data. Thus, confidentiality of data is not guaranteed anymore.

A known solution for controlling access to stored data is to employ split keys, e.g., in situations where several clients are available and at least a few of them are trusted. The owner of the stored data may then apply so-called secret sharing of the keys, or possibly of the data, in such a way that only several clients, i.e., more than one client, jointly can retrieve the encrypted data. For example, the owner may split the key among n clients in such a way that at least n/2+1 clients, i.e., a majority of the clients, are required to co-operate in order to obtain the key or the stored data. Several schemes for secret sharing are known in the art.

While splitting of keys provides an improved protection, straightforward usage of this technique implies that a group of clients holding parts of the key can reconstruct the complete key without involving the owner of the data. Also, existing schemes for policy and access control do not provide security if non-malicious mistakes are made. For example, a data storage provider may by mistake grant access to clients not authorized by the owner, e.g., due to misconfiguration of access policies.

SUMMARY

It is an object of the invention to provide an improved alternative to the above techniques and prior art.

More specifically, it is an object of the invention to provide an improved way of performing an operation on a data storage for storing data being encrypted with a key associated with an owner of the data. In particular, it is an object of the invention to provide an improved access control for client devices, also referred to as clients throughout the present disclosure, requesting to perform an operation on the data storage.

These and other objects of the invention are achieved by means of different aspects of the invention, as defined by the independent claims. Embodiments of the invention are characterized by the dependent claims.

According to a first aspect of the invention, a method of performing an operation on a data storage for storing data is provided. Data stored in the data storage is encrypted with a key $K^D$ associated with an owner of the data. The method comprises, for each client $C_j$ of one or more clients which are authorized to perform operations on the data storage, deriving a first key $K_{Cj}$ and a second key $K_{Tj}$, providing the client $C_j$ with the first key $K_{Cj}$, and providing a TTP with the second key $K_{Tj}$. The first key $K_{Cj}$ and the second key $K_{Tj}$ are derived such that the key $K^D$ can be derived from the first key $K_{Cj}$ and the second key $K_{Tj}$. The method further comprises, at a PEP, receiving a request for performing the operation on the data storage from a client $C_k$ of the one or more clients, acquiring a first key $K_{Ck}$ from the client $C_k$, acquiring a second key $K_{Tk}$ from the TTP, deriving the key $K^D$ from the first key $K_{Ck}$ and the second key $K_{Tk}$, and performing the operation on the data storage using the derived key $K^D$.

According to a second aspect of the invention, a method of performing an operation on a data storage for storing data is provided. Data stored in the data storage is encrypted with a key $K^D$ which is associated with an owner of the data. The method is performed by a PEP. The method comprises receiving a request for performing the operation on the data storage from a client $C_k$ of one or more clients which are authorized to perform operations on the data storage, acquiring a first key $K_{Ck}$ from the client $C_k$, acquiring a second key $K_{Tk}$ from a TTP, deriving the key $K^D$ from the first key $K_{Ck}$ and the second key $K_{Tk}$, and performing the operation on the data storage using the derived key $K^D$.

According to a third aspect of the invention, a method of performing an operation on a data storage for storing data is provided. Data stored in the data storage is encrypted with a key $K^D$ which is associated with an owner of the data. The method is performed by a TTP. The method comprises, for each client $C_j$ of one or more clients which are authorized to perform operations on the data storage, receiving a second key $K_{Tj}$ and storing the second key $K_{Tj}$. The second key $K_{Tj}$ is derived such that the key $K^D$ can be derived from a first key $K_{Cj}$ associated with the client $K_{Cj}$ and the second key $K_{Tj}$. The method further comprises receiving a request from a PEP for a second key $K_{Tk}$ associated with a client $C_k$ of the one or more clients, the client $C_k$ requesting to perform the operation on the data storage, and providing the PEP with the second key $K_{Tk}$.

According to a fourth aspect of the invention, a method of performing an operation on a data storage for storing data is provided. Data stored in the data storage is encrypted with a key $K^D$ which is associated with an owner of the data. The method is performed by a client $C_k$. The method comprises receiving a first key $K_{Ck}$ and storing the first key $K_{Ck}$. The first key $K_{Ck}$ is derived such that the key $K^D$ can be derived from the first key $K_{Ck}$ and a second key $K_{Tk}$ associated with the client $C_k$. The method further comprises transmitting a request for performing the operation on the data storage to a PEP and providing the first key $K_{Ck}$ to the PEP.

According to a fifth aspect of the invention, a PEP for performing an operation on a data storage for storing data is provided. Data stored in the data storage is encrypted with a key $K^D$ associated with an owner of the data. The PEP comprises processing means adapted to receive a request for performing the operation on the data storage from a client $C_k$ of one or more clients which are authorized to perform operations on the data storage, acquire a first key $K_{Ck}$ from the client $C_k$, acquire a second key $K_{Tk}$ from a TTP, derive the key $K^D$ from the first key $K_{Ck}$ and the second key $K_{Tk}$, and perform the operation on the data storage using the derived key $K^D$.

According to a sixth aspect of the invention, a TTP for performing an operation on a data storage for storing data is provided. Data stored in the data storage is encrypted with a key $K^D$ associated with an owner of the data. The TTP comprises processing means adapted to, for each client $C_j$ of one or more clients which are authorized to perform operations on the data storage, receive a second key $K_{Tj}$ and store the second key $K_{Tj}$. The second key $K_{Tj}$ is derived such that the key $K^D$ can be derived from a first key $K_{Cj}$ associated with the client $C_j$ and the second key $K_{Tj}$. The processing means is further adapted to receive a request from a PEP for a second key $K_{Tk}$ associated with a client $C_k$ of the one or more clients, the client $C_k$ requesting to perform the operation on the data storage, and to provide the PEP with the second key $K_{Tk}$.

According to a seventh aspect of the invention, a client $C_k$ for performing an operation on a data storage for storing data is provided. Data stored in the data storage is encrypted with a key $K^D$ associated with an owner of the data. The client comprises processing means adapted to receive a first key $K_{Ck}$ and store the first key $K_{Ck}$. The first key $K_{Ck}$ is derived such that the key $K^D$ can be derived from the first key $K_{Ck}$ and a second key $K_{Tk}$ associated with the client $C^k$. The processing means is further adapted to transmit a request for performing the operation on the data storage to a PEP and provide the PEP with the first key $K_{Ck}$.

According to further aspects of the invention, computer programs comprising instructions are provided. The instructions are adapted, if executed on at least one processor, to implement embodiments of the methods according to any one of the first, second, third, or fourth, aspect of the invention described hereinabove.

According to even further aspects of the invention, computer readable storage media are provided. The computer readable storage media have stored thereon the computer programs according to the corresponding aspects of the invention.

The invention makes use of an understanding that an improved access control for data which is being stored in a data storage may be achieved based on the trust model disclosed herein. The entities involved in embodiments of the invention are, besides the data storage and the owner of the data, a PEP, a TTP, and one or more clients requesting to perform an operation on the data storage. An operation on the data storage includes, but is not limited to, retrieving data stored in the data storage, searching for data stored in the data storage, storing data in the data storage, performing computations/transformation on data stored in the data storage, and deleting data stored in the data storage.

The data storage, such as a PDV, is partly trusted to the extent that it is hosting data of the owner, e.g., files, documents, pictures, music, videos, a relational database, a graph database, a NoSQL database, or the like. Here, it is assumed that the provider of the data storage may make mistakes, e.g., granting access to a client not authorized by the owner of the data. Further, the data storage provider is not assumed to provide sufficient security against data/key theft by, e.g., hackers. Thus, data stored in the data storage must be encrypted by a data key $K^D$ which is not available to the data storage provider.

The PEP may or may not be co-located with the data storage. The PEP is implementing access control policies on behalf of the owner of the data. Here, it is assumed that the PEP may make mistakes regarding access control, e.g., due to misconfiguration of access policies. The PEP may be in possession of the key $K^D$, used for encrypting data stored in the data storage, for a limited period of time. The PEP is trusted in the sense that users (of the PEP) are comfortable with making their data and their keys be temporarily available to the PEP, feeling assured that the PEP won't expose such data or keys to other parties.

The TTP is a partially trusted third party separate from the data storage and the clients, and is trusted to keep small amounts of data on the owner's behalf. However, neither the TTP entity is fully trusted to provide security against hackers stealing data or keys. The TTP may, e.g., be provided, or managed, by a network operator, such as an operator of a telecommunication network.

The clients, such as users of the data storage or service providers wishing to access data of the owner, request to perform an operation on the data storage. Authorized clients should be able to perform the operation according to the owner's policy, even if the owner is offline. Clients may be authorized to perform operations on the data storage in different ways. For instance, clients may be authorized on request, i.e., on an individual basis. As an alternative, clients may be authorized as part of a group of clients, e.g., all clients which belong to an organization which has been authorized, such as all computers of a company renting storage resources from a data storage provider.

The client, or client device, may be a computing devices such as a computer, a mobile phone, a smart phone, a User Equipment (UE), a tablet computer, a digital camera, or the like, used by a user for accessing the data storage. The client device is capable of communicating with the PEP, e.g., over a communications network.

The solution proposed here is based on a number of "parallel copies", or "parallel instances", of secret sharing of the data key $K^D$, which is associated with the owner of the data and is used for encrypting the data stored in the data storage. Each of the copies, or instances, involves the TTP and one of the clients. That is, for each parallel instance of the secret sharing, the key $K^D$ is shared between one of the clients and the TTP. This may be achieved using any type of two-part secret sharing, such as Shamir's polynomial-interpolation based scheme, Blakely's projective geometry scheme, or schemes based on modulo-m addition which are well-known derivatives of Vernam's and Shannon's "one-time pad encryption". In the present disclosure, a simple instantiation of a Vernam/Shannon scheme using a modulo-2 scheme (or "XOR") is used for illustrative purposes.

To this end, the owner of data stored in the data storage, which data is encrypted using the key $K^D$, is the only one having unlimited access to the entire key $K^D$. The key $K^D$ may be generated and/or distributed in any suitable way known in the art, by the owner, the PEP, or any other reasonably well-trusted entity. Each client which is authorized to perform an operation on the data storage is in possession of one part of the key only, also referred to as the first key, whereas the TTP is in possession of the corresponding other part of the key, i.e., the second key. In order to perform an operation on the data storage, such as retrieving data, the first key is combined with the corresponding second key before the operation can be performed. The two parts of the keys are combined at the PEP.

According to an embodiment of the invention, the method further comprises, for each client $C_j$ of the one or more clients, associating an identifier $ID_j$ with the second key $K_{Tj}$ and providing the client $C_j$ with the identifier $ID_j$. The steps of associating an identifier with the second key and providing the client and with the identifier are preferably performed by the PEP, and may alternatively be performed by the client. Preferably, these steps are performed in connection with deriving the first and the second key. Further, at the PEP, in response to receiving the request for performing the operation on the data storage from the client $C_k$, the identifier $ID_k$ is acquired from the client $C_k$ and the second key $K_{Tk}$ is acquired from the TTP using the identifier $ID_k$. Associating an identifier with each second key is advantageous in that it facilitates managing the second keys by the TTP.

According to an embodiment of the invention, the method further comprises, at the PEP, storing information pertaining to which clients are authorized to perform operations on the data storage and, in response to receiving the request for performing the operation on the data storage by the client $C_k$, verifying whether the client $C_k$ is authorized to perform operations on the data storage. The requested operation on the data storage is only performed if the client $C_k$ is authorized to perform operations on the data storage. Applying a policy check before requesting a second key from the TTP, combining keys, and performing the operation on the data storage, is advantageous in that requests from non-authorized clients may be rejected, or simply not processed, at an early stage. Thereby, the risk for overload attacks exploiting requests from non-authorized clients is reduced. As an alternative, the PEP may additionally store information pertaining to which type, or types, of operations a client may perform. Accordingly, the PEP may verify whether the client $C_k$ is authorized to perform the requested operation on the data storage, rather than verifying whether the client $C_k$ is authorized to perform operations in general, and the requested operation is only performed if the client $C_k$ is authorized to perform the requested operation.

According to an embodiment of the invention, for each client $C_j$, one key of the first key $K_{Cj}$ and the second key $K_{Tj}$ is derived randomly, and the other key of the first key $K_{Cj}$ and the second key $K_{Tj}$ is derived from $K^D$ and the randomly derived key. Alternatively, one key of the first key $K_{Cj}$ and the second key $K_{Tj}$ may be derived pseudo-randomly. As yet a further alternative, any known way of two-part secret sharing known in the art may be used.

According to an embodiment of the invention, the method further comprises, at the PEP, deleting the key $K^D$ after the performing the operation on the data storage is completed. That is, the PEP discards the key $K^D$ after the operation is performed, e.g., data retrieved from the data storage is decrypted. Preferably, also the first key $K_{Ck}$ and the second key $K_{Tk}$, from which the key $K^D$ was derived, are deleted. This is advantageous in that the risk of exposure and malicious usage of the key is reduced.

According to an embodiment of the invention, the request for performing the operation on the data storage relates to retrieving data stored in the data storage. Further, the performing the operation on the data storage comprises acquiring the requested data from the data storage and decrypting the acquired data using the derived key $K^D$.

According to an embodiment of the invention, the performing the operation on the data storage further comprises transmitting the decrypted data to the client $C_k$. Optionally, the requested data is re-encrypted before transmission to the client, e.g., using Transport Layer Security (TLS) or IPsec.

According to an embodiment of the invention, the request for performing the operation on the data storage comprises information identifying the requested data, such as a Uniform Resource Locator (URL), a Uniform Resource Identifier (URI), or a file name. Further, the acquiring the requested data from the data storage comprises transmitting the information identifying the requested data to the data storage and receiving, from the data storage, at least a portion of the requested data. The portion is identified by the information identifying the requested data.

According to an embodiment of the invention, a searchable index of data stored in the data storage is stored in the data storage. The searchable index is encrypted using a key $K^S$. Further, the information identifying the requested data received from the client $C_k$ comprises at least one search term which is encrypted using the key $K^S$ before transmitting the encrypted at least one search term to the data storage. The index and the at least one search term have to be encrypted using the same key.

According to an embodiment of the invention, the request for performing the operation on the data storage relates to storing data in the data storage. Further, the performing the operation on the data storage comprises acquiring the data to be stored from the client $C_k$, encrypting the data to be stored using the derived key $K^D$, and transmitting the encrypted data to the data storage.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

In the following, the different entities on which embodiments of the invention are based are described with reference to FIG. 1, which shows a system 100 for performing an operation on a data storage 101 for storing data 106 which is encrypted with a data key $K^D$ associated with an owner 102 of the data 106. Besides the data storage 101, which may be a PDV or any other network or cloud based data storage, and the owner 102, the system 100 comprises a PEP 103, a TTP 104, and one or more client devices 105, also referred to as clients 105. For the sake of simplicity, only two client devices 105 (having identifiers $C_j$ and $C_{j'}$, respectively), are shown in FIG. 1, but embodiments of the invention are not limited to this and may involve any number of clients 105.

Note that it is assumed here that only one key $K^D$ is used for encrypting the data of the owner. It is, of course, straightforward to extend the solution disclosed herein to different types or categories of data, each type or category being associated with a separate data key. That is, the owner may use one data key for encrypting pictures, another data key for encrypting music files, and yet another data key for encrypting work related documents. In this way, the owner may separately control access to the different categories of data, in accordance with embodiments of the invention.

Figure 1:
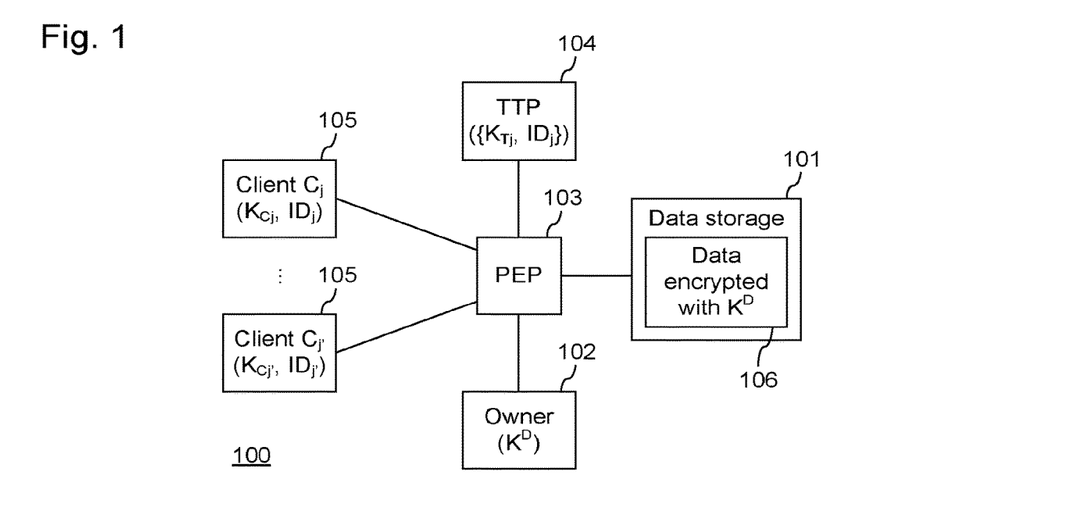
FIG. 1 shows the different entities of a system for performing an operation on a data storage, in accordance with an embodiment of the invention.

In FIG. 1, it is further illustrated which keys and related information the entities 101 to 105 have access to. The data storage 101 is assumed to not have access to any of the data key $K^D$, the first, or the second key. Rather, data 106 which is stored in the data storage 101 is encrypted with the data key $K^D$ before it is transferred to the data storage 101, or decrypted after it has been retrieved from the data storage 101.

The key $K^D$ which is used for encrypting data 106 stored in the data storage 101 is associated with the owner 102. That is, the owner 102 is assumed to be the only entity of the entities described herein which has unlimited access to the key $K^D$. The key $K^D$ may be generated and/or distributed to the owner 102 in any suitable way known in the art. For instance, the key may generated by the owner 102, e.g., by an application which is executed on a device used by the owner 102, or by the PEP 103 on request by the owner 102. Alternatively, the key $K^D$ may be generated by a hardware component, i.e., an electronic circuitry, which such a device is provided with.

The PEP 103 is assumed to not have unlimited access to any of the keys but is entrusted to retain the data key $K^D$ during a limited period of time until an operation on the data storage, such as retrieving data 106, searching for data 106, or storing data 106, is completed. Thus, the PEP 103 is trusted to erase the data key $K^D$ when no longer needed. While outside the scope of the invention, it is noted that assurance of proper key handling (and, in general, assurance of correct operation of the PEP) may be obtained by various means known in the art, e.g., trusted computing techniques such as remote attestation of the PEP's configuration/software.

In order to enable a client 105 to perform an operation on the data storage 101 even while the owner 102 is offline, and henceforth not available for providing the requesting client 105 with the key $K^D$, each of the clients 105 is entrusted to store one part of a two-part secret sharing, i.e., the first key, whereas the other part of the secret sharing is kept by the TTP 104. In order to facilitate the discussion, it is here assumed that each client 105 is identified by a, preferably unique, identifier $C_j$. Accordingly, the first key which is stored at the client $C_j$ 105 is denoted as $K_{Cj}$, whereas the corresponding part of the secret sharing, the second key, is denoted as $K_{Tj}$, and is stored at the TTP 104. The first key $K_{Cj}$ associated with client $C_j$ 105 is preferably unique. That is, another first key $K_{Cj'}$ associated with another client $C_{j'}$ 105 is assumed to be different from the first key $K_{Cj}$. Accordingly, the corresponding second keys $K_{Tj}$ and $K_{Tj'}$ are assumed to be distinct.

The TTP 104 is entrusted to keep small amounts of data on the owner's 102 behalf. Specifically, the TTP 104 keeps, for each client $C_j$ 105 which is authorized to perform an operation on the data storage 101, a second key $K_{Tj}$ representing the other part of the secret sharing associated with the client $C_j$ 105. That is, the TTP 104 keeps a set of the second keys, $\{K_{Tj}\}$, one for each authorized client.

Optionally, an identifier $ID_j$ may be used in order to facilitate the handling of keys. To this end, for each client $C_j$ 105 which is authorized to perform operations on the data storage, a preferably unique identifier $ID_j$ is associated with the second key $K_{Tj}$ and is distributed to the client $C_j$ 105, preferably together with the first key $K_{Cj}$. Subsequently, a client requesting to perform an operation on the data storage 101 may provide the PEP 103 with the identifier, which is then forwarded to the TTP 104 where it is used to look up the corresponding second key for the requesting client. The identifier may, e.g., be an identifier of the client with which the keys are associated, i.e., "$C_j$". In this case the identifier $ID_j$ may also be provided to the TTP 104, where it is stored together with the second key $K_{Tj}$ and subsequently used for looking up the corresponding second key when a client requests to perform an operation on the data storage 101. As an alternative, the identifier $ID_j$ may be a hash of the second key $K_{Tj}$. In that case, the identifier $ID_j$ may be generated at the TTP 104 upon receiving the second key $K_{Tj}$, and stored together with the second key $K_{Tj}$.

Figure 2:
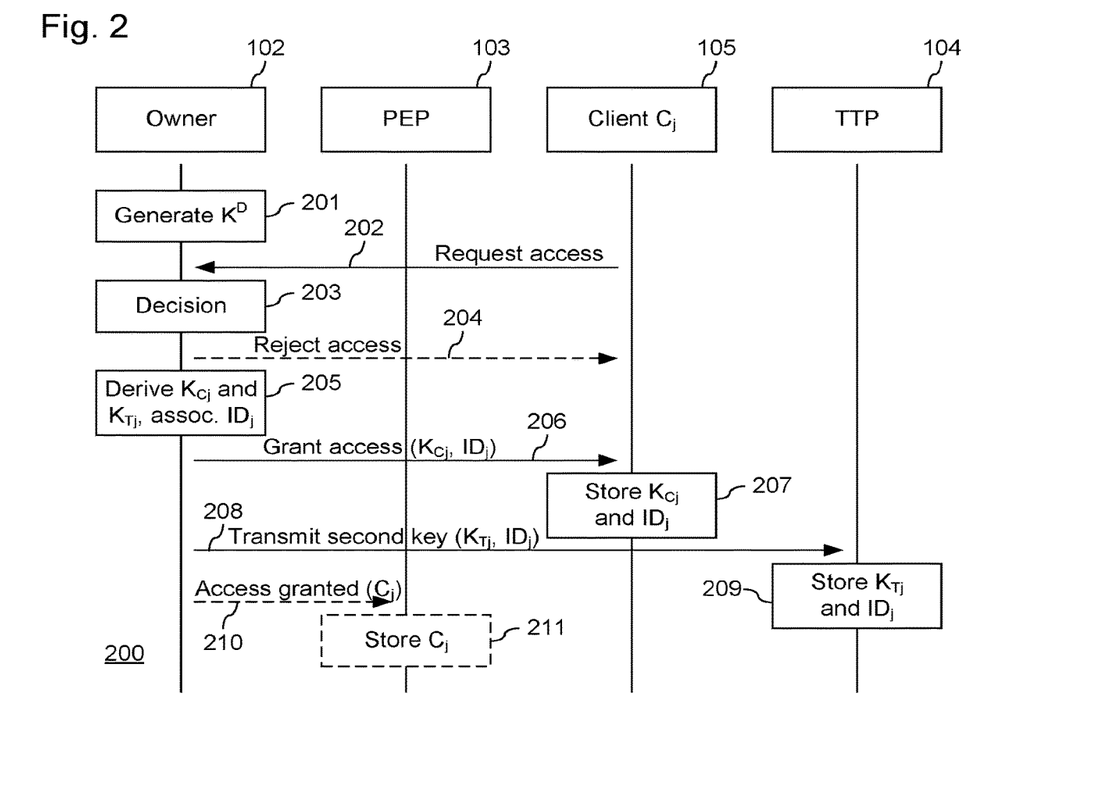
FIG. 2 shows a method of generating and distributing keys, in accordance with an embodiment of the invention.

In the following, an embodiment of the invention is described with reference to FIG. 2, which illustrates a method 200 of distributing keys, in particular the first keys and the second keys, among the entities described with reference to FIG. 1. Note that, for the sake of simplicity, certain known security procedures are omitted from the procedures and the accompanying figures. For example, it may be advantageous that the parties involved in the message exchanges described hereinafter have authenticated each other by some well-known means, e.g., using TLS or a Generic Bootstrapping Architecture (GBA), thereby establishing trust in the authenticity/identity of all involved parties.

Method 200 starts with generating 201 the data key $K^D$ by the owner 102. The key $K^D$ may be generated 201 using software, such as an app or application, which is executed by a device used by the owner 102 for accessing the data storage 101.

In response to receiving 202 a request from a client $C_j$ 105 for authorization to perform operations on the data storage 101, the owner 102 decides 203 whether to grant the request or not. For instance, the owner 102 may be notified by means of email or a notification which is made visible on the device used by the owner 102 for accessing the data storage 101. As an alternative, the decision 203 may be based on a policy. For instance, clients may be authorized to perform operations automatically, based on credentials received with the request 202, such as login information, a password, or the like. As yet a further alternative, a client may be authorized based on an organization which the client belongs to, or an address of the client, such as an Internet Protocol (IP) address or a Medium Access Control (MAC) address. Optionally, if the request 202 for access is rejected, the client $C_j$ 105 may be notified 204.

If it is decided 203 that the client $C_j$ 105 is authorized to perform operations on the data storage 101, the first key $K_{Cj}$ and the second key $K_{Tj}$ are derived 205 from the data key $K^D$. For instance, the first key $K_{Cj}$ may be generated randomly, and the second key $K_{Tj}$ may be derived from the first key $K_{Cj}$ and the data key $K^D$, e.g., as $K_{Tj}=K^D$ XOR $K_{Cj}$, or any other method for two-part secret sharing which is known in the art. As an alternative, the second key $K_{Tj}$ may be generated randomly and the first key $K_{Cj}$ may be derived from the second key and the data key, e.g., as $K_{Cj}=K^D$ XOR $K_{Tj}$. Optionally, an identifier $ID_j$ may be associated 205 with the second key $K_{Tj}$, as was described hereinbefore.

Subsequent to deriving 205 the first and the second key, the client $C_j$ 105 is notified 206 that it may perform operations on the data storage 101. This may, e.g., be effected by transmitting 206 the first key $K_{Cj}$ to the client $C_j$ 105. Optionally, the identifier $ID_j$ may be transmitted to the client $C_j$ 105 as part of the message 206. In response to receiving 206 the first key $K_{Cj}$, the client $C_j$ 105 stores 207 the first key $K_{Cj}$ and, optionally, the identifier $ID_j$ associated with the second key. In addition to transmitting 206 the first key to the client 105, the owner 102 transmits 208 the second key $K_{Tj}$ to the TTP 104, where it is stored 209. Optionally, the identifier $ID_j$ is transmitted 208 together with the second key and stored 209 at the TTP 104. Alternatively, the identifier $ID_j$ is generated at the TTP 104 and stored 209 together with the second key $K_{Tj}$, as was described hereinbefore.

In addition to deriving and distributing the first key and the second key, the method 200 may comprise notifying 210 the PEP 103 that the client $C_j$ 105 is authorized to perform operations on the data storage 101. In response to receiving the notification 210, the PEP 103 may store 211 information pertaining to the authorized client $C_j$ 105, such as an identifier of the client (e.g., "$C_j$" or "j"), for the purpose of performing a policy check when a request for performing an operation is received from a client, as is described further below.

Figure 3:
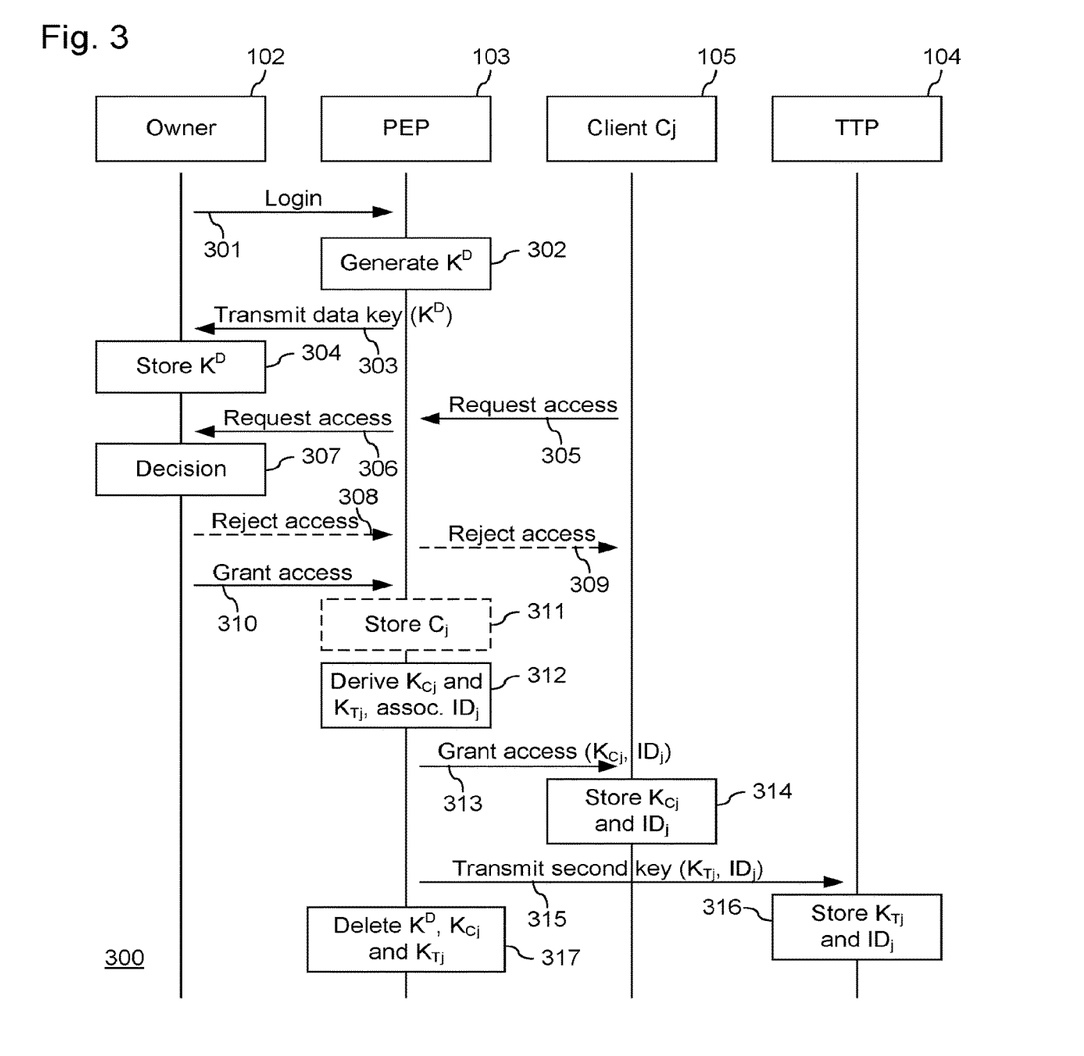
FIG. 3 shows a method of generating and distributing keys, in accordance with another embodiment of the invention.

An alternative method 300 of distributing keys is now described with reference to FIG. 3. Method 300 starts with the owner 102 login 301 into the PEP 103, where the data key $K^D$ is generated 302 similar to what was described before with reference to step 201. Subsequently, the key $K^D$ is transmitted 303 to the owner 102 where it is stored 304 for the purpose of encrypting and/or decrypting data.

Subsequently, the PEP 103 receives 305 a request for authorization to perform operations on to the data storage 101 from a client $C_j$ 105. The request is forwarded 306 to the owner 102 where a decision 307 is taken whether to authorize the requesting client or not, in correspondence to what was described before with reference to step 203. Optionally, if the decision 307 is to reject the request, the PEP 103 and the client 105 are notified 308/309 accordingly.

In response to a decision 307 to authorize the client $C_j$ 105 to perform operations on the data storage 101, the PEP 103 is notified 310. In response to receiving 310 the notification, the PEP 103 derives 312 the first key $K_{Cj}$ and the second key $K_{Tj}$ in accordance with what was described before with reference to step 205. Optionally, the PEP 103 may store 311 information pertaining to the client $C_j$ 105, such as an identifier of the client (e.g., "$C_j$" or "j"), for the purpose of performing a policy check when a request for performing an operation is received from a client, as is described further below.

Similar to what was described with reference to FIG. 2, the first key $K_{Cj}$ is transmitted 313 to the client Cj 105, where it is stored 314, and the second key $K_{Tj}$ is transmitted 315 to the TTP 104, where it is stored 316. Optionally, the step of deriving 312 the first and the second key may further comprise associating an identifier $ID_j$ with the second key. The identifier $ID_j$ is transmitted 313 to the client $C_j$ 105, where it is stored 314 together with the first key $K_{Cj}$. Optionally, the identifier $ID_j$ is also transmitted 315 to the TTP 104, where it is stored 316 together with the second key $K_{Tj}$. Alternatively, the identifier $ID_j$ is generated at the TTP 104 and stored 316 together with the second key $K_{Tj}$. For instance, the identifier $ID_j$ may be a hash of the second key.

After the PEP 103 has distributed the first key and the second key to the client 105 and the TTP 104, respectively, the PEP 103 preferably deletes 317 the data key $K^D$, the first key $K_{Cj}$, and the second key $K_{Tj}$.

Once a client 105 is in possession of its first key, and the TTP 104 is in possession of the corresponding second key, that client 105 may perform operations on the data storage 101, as is described in the following, without requesting authorization from the owner 102. That is, after the owner 102 has authorized a client to perform operations on the data storage 101 in accordance which what is described with reference to FIGS. 2 and 3, no further authorization by the owner 102 is required for subsequent requests from the authorized client. Such operations may, e.g., relate to retrieving data from the data storage 101, searching data stored in the data storage 101, or storing data, on behalf of the owner 102, in the data storage 101.

It will be appreciated that a client may be authorized to perform any type of operations on the data storage or only one or several specific operations. For instance, a certain client my only be authorized to retrieve data from the data storage, while another client may be authorized to retrieve data from the data storage and store data in the data storage. Such policies may be configured using policy languages such as XACML. Accordingly, with reference to FIG. 2, the owner 102 may notify 210 the PEP 103 that the client $C_j$ is authorized to perform a certain type of operation, or certain types of operations, on the data storage 105, and the PEP 103 may store 211 such policy. Correspondingly, with reference to FIG. 3, the owner 102 may notify 310 the PEP 103 that the client $C_j$ is authorized to perform a certain type of operation, or certain types of operations, on the data storage 105, and the PEP 103 may store 311 such policy.

Figure 4:
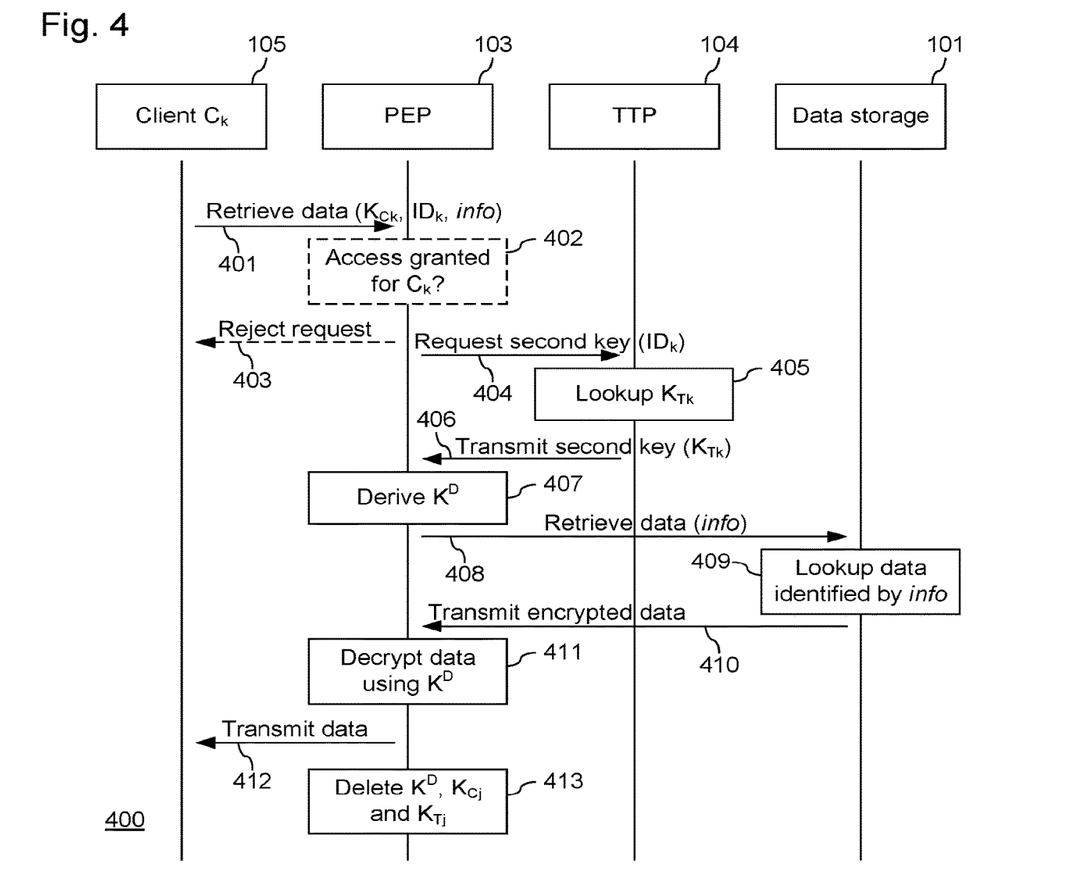
FIG. 4 shows a method of retrieving data from the data storage, in accordance with an embodiment of the invention.

With reference to FIG. 4, a method 400 of retrieving data 106 from the data storage 101, on request by a client $C_k$ 105, is described. It is assumed that the client $C_k$ 105 is in possession of a first key $K_{Ck}$ and an identifier $ID_k$, and the TTP 104 is in possession of a second key $K_{Tk}$ and the identifier $ID_k$. The first key $K_{Ck}$, the second key $K_{Tk}$, and the identifier $ID_k$, are generated in accordance with was described hereinbefore, in particular with reference to FIGS. 2 and 3.

The method 400 starts with the client $C_k$ 105 transmitting 401 a request for retrieving data to the PEP 103. The request 401 comprises the first key $K_{Ck}$ and information identifying the requested data (in FIG. 4 illustrated as info), e.g., a file name, or any other suitable identifier of a data item 106 stored in the data storage 101, and the identifier $ID_k$. Preferably, but omitted from FIG. 4, the PEP 103 and client $C_k$ 105 have authenticated each other, e.g., using TLS, before the message exchange shown in FIG. 4 takes place. In response to receiving the request 401, the PEP 103 may optionally check 402 whether the client $C_k$ 105 is authorized to perform operations, or the requested operation, on the data storage 101. This may, e.g., be achieved by comparing an identifier of the requesting client, such as "$C_k$" or "k", with a policy configured by the owner 102. If the client $C_k$ 105 is not authorized to perform operations, or the requested operation, on the data storage 101, the client $C_k$ 105 may optionally be notified 403 that the request is rejected.

Subsequently, the PEP 103, having received 401 the first key $K_{Ck}$ from the client $C_k$ 105, requests 404 the corresponding second key $K_{Tk}$ from the TTP 104. This may, e.g., be achieved by transmitting the identifier $ID_k$ together with the request 404. Preferably, the TTP 104 also authenticates the PEP 103 (not shown in FIG. 4). In response to receiving 404 the request, the TTP 104 retrieves 405 the requested second key $K_{Tk}$, e.g., from a local storage, such as a database for storing the second keys for all clients which have been authorized to perform operations on the data storage, and transmits 406 the second key $K_{Tk}$ to the PEP 103. At the PEP 103, the data key $K^D$ is derived 407 from the first key $K_{Ck}$, received 401 from the client $C_k$ 105, and the second key $K_{Tk}$, received 406 from the TTP 104. The data key $K^D$ is derived in a way which corresponds to the way the first and second keys are derived as part of the methods 200 and 300 of generating and distributing keys. For instance, the key $K^D$ may be derived as $K^D = K_{Ck}$ XOR $K_{Tk}$.

Then, the PEP 103 retrieves 408 the requested data from the data storage 101 which looks up the one or more data items 106 identified by info and transmits 410 the requested data to the PEP 103. In response to receiving 410 the requested, encrypted, data, the PEP 103 decrypts 411 the received data and transmits 412 the decrypted data to the requesting client $C_k$ 105. Optionally, the data is re-encrypted before transmission 412 to the client $C_k$ 105, e.g., using TLS or IPsec. After the retrieved data is decrypted 411, unless there are further, pending, data retrieval requests from the client $C_k$ 105, the PEP 103 deletes 413 the key $K^D$ which it has derived 407, as well as the first key $K_{Cj}$ and the second key $K_{Tj}$.

Figure 5:
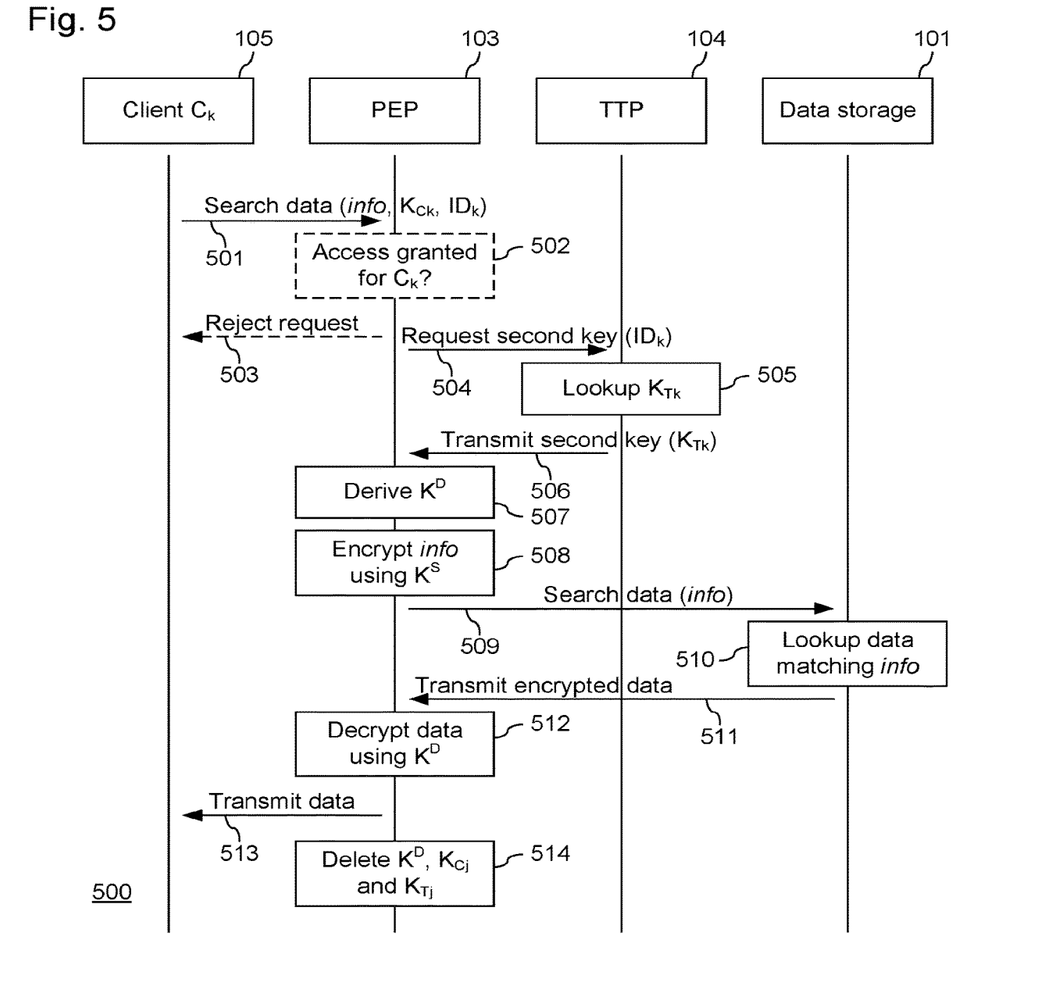
FIG. 5 shows a method of searching data in the data storage, in accordance with an embodiment of the invention.

With reference to FIG. 5, a method 500 of searching 106 data stored in the data storage 101, on request by a client $C_k$ 105, is described. It is assumed that the client $C_k$ 105 is in possession of a first key $K_{Ck}$ and an identifier $ID_k$, and the TTP 104 is in possession of a second key $K_{Tk}$ and the identifier $ID_k$. The first key $K_{Ck}$, the second key $K_{Tk}$, and the identifier $ID_k$, are generated in accordance with what was described hereinbefore, in particular with reference to FIGS. 2 and 3.

The method 500 starts with the client $C_k$ 105 transmitting 501 a request for searching data to the PEP 103. The request 501 comprises the first key $K_{Ck}$ and information identifying the data to which the search request pertains (in FIG. 5 illustrated as info), i.e., one or more search terms or a search phrase, and the identifier $ID_k$. Preferably, but omitted from FIG. 5, the PEP 103 and client $C_k$ 105 have authenticated each other, e.g., using TLS, before the message exchange shown in FIG. 5 takes place. In response to receiving the request 501, the PEP 103 may optionally check 502 whether the client $C_k$ 105 is authorized to perform operations, or the requested operation, on the data storage 101, similar to what was described before with reference to step 402. If the client $C_k$ 105 is not authorized to perform operations, or the requested operation, on the data storage 101, the client $C_k$ 105 may optionally be notified 503 that the request is rejected.

Subsequently, the PEP 103, having received 501 the first key $K_{Ck}$ from the client $C_k$ 105, requests 504 the corresponding second key $K_{Tk}$ from the TTP 104. This may, e.g., be achieved by transmitting the identifier $ID_k$ together with the request 504. Preferably, the TTP 104 also authenticates the PEP 103 (not shown in FIG. 5). In response to receiving 504 the request, the TTP 104 retrieves 505 the requested second key $K_{Tk}$, e.g., from a local storage, such as a database for storing the second keys for all clients which are authorized to perform operations on the data storage, as was described with reference to FIGS. 2 and 3, and transmits 506 the second key $K_{Tk}$ to the PEP 103. At the PEP 103, the data key $K^D$ is derived 507 from the first key $K_{Ck}$ and the second key $K_{Tk}$. The data key $K^D$ is derived in a similar way as was described with reference to step 407.

The PEP 103 encrypts 508 the search terms or the search phrase, i.e., info, using a search key $K^S$ which may be identical to the data key $K^D$ or different from the data key $K^D$. For instance, the key $K^S$ may be derived from the key $K^D$. Further, the key $K^S$ may be split into a first key and a second key, in correspondence to what is described herein with respect to the key $K^D$. It will be appreciated that, regardless how the key $K^S$ is obtained, the index which is stored at the data storage 101 and the search term or search phrase have to be encrypted using the same key.

Then, the PEP 103 forwards 509 the search request to the data storage 101, the search request 509 comprising the encrypted one or more search terms or search phrase. The data storage 101 looks up 510 the one or more data items 106 matching info, as is known in the art, and transmits 511 the encrypted data, i.e., one or more data items matching info, to the PEP 103. In response to receiving 511 the encrypted data, the PEP 103 decrypts 412 the received data and transmits 513 the decrypted data to the requesting client $C_k$ 105. Optionally, the retrieved data is re-encrypted before transmission 513 to the client $C_k$ 105, e.g., using TLS or IPsec. After the retrieved data is decrypted 512, unless there are further, pending, search requests from the client $C_k$ 105, the PEP 103 deletes 514 the key $K^D$ which it has derived 507, as well as the first key $K_{Cj}$ and the second key $K_{Tj}$.

Figure 6:
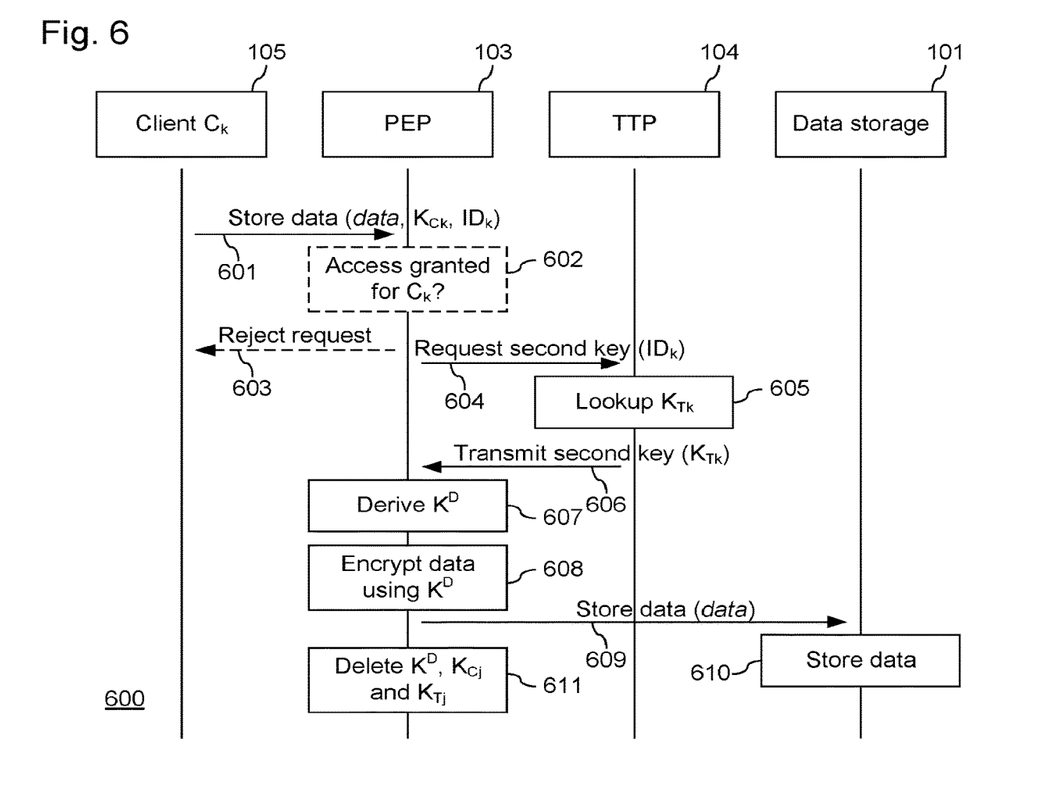
FIG. 6 shows a method of storing data in the data storage, in accordance with an embodiment of the invention.

With reference to FIG. 6, a method 600 of storing data 106 in the data storage 101, on request by a client $C_k$ 105, is described. The data is stored on behalf of the owner 102 since the data key $K^D$, which is associated with the owner 102, is utilized in performing the storage operation. It is assumed that the client $C_k$ 105 is in possession of a first key $K_{Ck}$ and an identifier $ID_k$, and the TTP 104 is in possession of a second key $K_{Tk}$ and the identifier $ID_k$. The first key $K_{Ck}$, the second key $K_{Tk}$, and the identifier $ID_k$, are generated in accordance with what has been described hereinbefore, in particular with reference to FIGS. 2 and 3.

The method 600 starts with the client $C_k$ 105 transmitting 601 a request for storing data to the PEP 103. The request 601 comprises the first key $K_{Ck}$, the data to be stored (in FIG. 6 illustrated as data), and the identifier $ID_k$. The data to be stored may be one or more data items, e.g., files. The request 601, or at least the data to be stored, is preferably encrypted, e.g., using TLS or IPsec. Preferably, but omitted from FIG. 6, the PEP 103 and client $C_k$ 105 have authenticated each other, e.g., using TLS, before the message exchange shown in FIG. 6 takes place. In response to receiving the request 601, the PEP 103 may optionally check 602 whether the client $C_k$ 105 is authorized to perform operations, or the requested operation, on the data storage 101, similar to what was describe before with reference to step 402. If the client $C_k$ 105 is not authorized to perform operations, or the requested operation, on the data storage 101, the client $C_k$ 105 may optionally be notified 603 that the request is rejected.

Subsequently, the PEP 103, having received 601 the first key $K_{Ck}$ from the client $C_k$ 105, requests 604 the corresponding second key $K_{Tk}$ from the TTP 104. This may, e.g., be achieved by transmitting the identifier $ID_k$ together with the request 604. Preferably, the TTP 104 also authenticates the PEP 103 (not shown in FIG. 6). In response to receiving 604 the request, the TTP 104 retrieves 605 the requested second key $K_{Tk}$, e.g., from a local storage, such as a database for storing the second keys for all clients which have been granted access to the data storage, as was described with reference to FIGS. 2 and 3, and transmits 606 the second key $K_{Tk}$ to the PEP 103. At the PEP 103, the data key $K^D$ is derived 607 from the first key $K_{Ck}$ and the second key $K_{Tk}$. The data key $K^D$ is derived in a similar way as was described with reference to step 407.

Then, the PEP 103 encrypts the data to be stored, i.e., data, using the derived key $K^D$, and transmits 609 the encrypted data to the data storage 101. In response to receiving 609 the encrypted data, the data storage 101 stores 610 the data 106. Optionally, the data storage 101 may notify the PEP 103 whether the storage operation was successful or not (not shown in FIG. 6). After the data to be stored is encrypted 608, unless there are further, pending, storage requests from the client $C_k$ 105, the PEP 103 deletes 611 the key $K^D$ which it has derived 607, as well as the first key $K_{Cj}$ and the second key $K_{Tj}$.

In the present context, "storing data" is not limited to storing new data items 106 in the data storage 101, but may also encompass updating an existing data item 106 which is stored in the data storage 101. For instance, a client 105 may retrieve a data item 106 from the data storage 101, update the data item, and store the updated data item 106 in the data storage 101.

Figure 7:
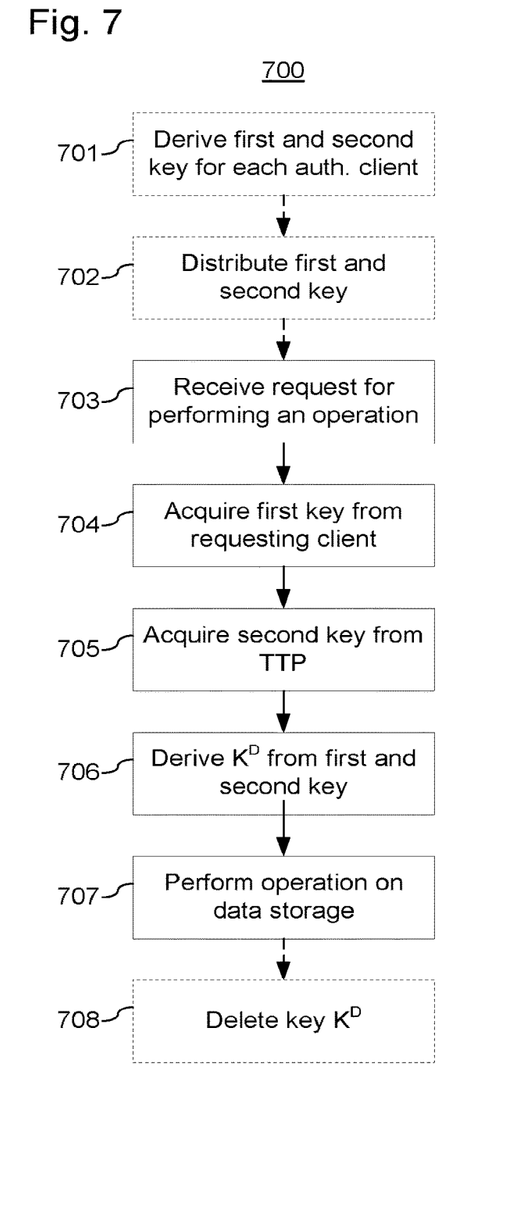
FIG. 7 shows a method of performing an operation on a data storage, the method being performed by a PEP, in accordance with an embodiment of the invention.

With reference to FIG. 7, an embodiment of the method of performing an operation on a data storage 101 for storing data, the method being performed by a PEP 103, is described. The data 106 stored in the data storage 101 is encrypted with a key $K^D$ associated with an owner 102 of the data. The method 700 comprises receiving 703 a request for performing the operation on the data storage 101. The request is received from a client $C_k$ 105 of one or more clients which are authorized to perform operations on the data storage 101. Preferably, the client $C_k$ 105 is authenticated by the PEP 103. The method 700 further comprises acquiring 704 a first key $K_{Ck}$ from the client $C_k$ 105 and acquiring 705 a second key $K_{Tk}$ from the TTP. The first key may, e.g., be comprised in the request for performing an operation which is received 703 from the client $C_k$ 105. The method 700 further comprises deriving 706 the key $K^D$ from the first key $K_{Ck}$ and the second key $K_{Tk}$, and performing 707 the operation on the data storage using the derived key $K^D$. Optionally, the method 700 may further comprise deriving 701 the first key $K_{Cj}$ and the second key $K_{Tj}$ for each client $C_j$ 105 which is authorized to perform operations on the data storage, and distribute 702 the keys, i.e., provide the client $C_j$ 105 with the first key $K_{Cj}$ and the TTP 104 with the second key $K_{Tj}$. As an additional, optional, step, the method 700 may comprise deleting 708 the key $K^D$ after the operation on the data storage 101 is completed.

Figure 8:
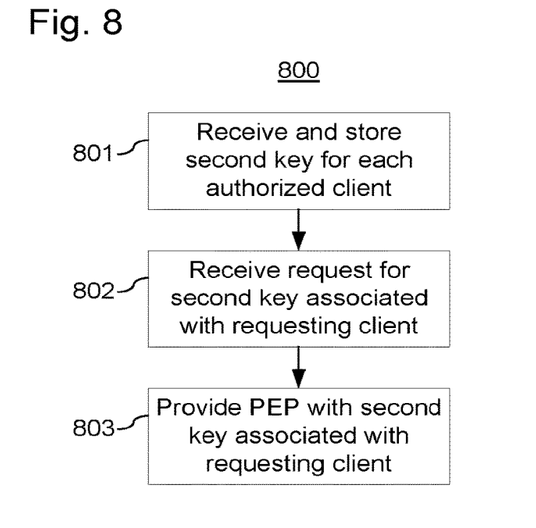
FIG. 8 shows a method of performing an operation on a data storage, the method being performed by a TTP, in accordance with an embodiment of the invention.

With reference to FIG. 8, an embodiment of the method of performing an operation on a data storage 101 for storing data, the method being performed by a TTP 104, is described. The data stored in the data storage 101 is encrypted with a key $K^D$ associated with an owner 102 of the data. The method 800 comprises receiving and storing a second key $K_{Tj}$ for each client $C_j$ 105 which is authorized to perform operations on the data storage 101. The second key $K_{Tj}$ is derived such that the key $K^D$ can be derived from a first key $K_{Tj}$ associated with the client $C_j$ 105 and the second key $K_{Tj}$. The method 800 further comprises receiving 802 a request for a second key $K_{Tk}$ associated with a client $C_k$ 105 requesting to perform the operation on the data storage 101. The request is received 802 from the PEP 103 and is preferably authenticated. The method 800 further comprises providing 803 the PEP 103 with the second key $K_{Tk}$. Optionally, the request for the second key may comprise an identifier $ID_k$ which is associated with the second key $K_{Tj}$, and the identifier $ID_k$ is used for providing the PEP 103 with the second key $K_{Tj}$. To this end, the identifier $ID_k$ may be used for looking up the second key which is associated with the requesting client $C_k$ 105 in a database of the TTP 104.

Figure 9:
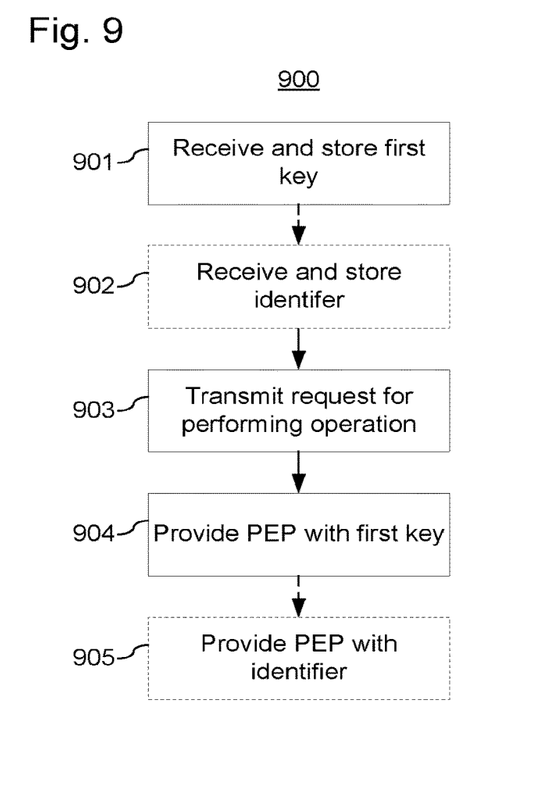
FIG. 9 shows a method of performing an operation on a data storage, the method being performed by a client, in accordance with an embodiment of the invention.

With reference to FIG. 9, an embodiment of the method of performing an operation on a data storage 101 for storing data, the method being performed by a client $C_k$ 105, is described. The data stored in the data storage 101 is encrypted with a key $K^D$ associated with an owner 102 of the data. The method 900 comprises receiving and storing 901 a first key $K_{Ck}$. The first key $K_{Ck}$ is derived such that the key $K^D$ can be derived from the first key $K_{Ck}$ and a second key $K_{Tk}$ associated with the client $C_k$ 105. The method 900 further comprises transmitting 903 a request for performing the operation on the data storage 101 to a PEP 103 and providing 904 the PEP 103 with the first key $K_{Ck}$. The first key may be comprised in the request. Optionally, the method 900 may further comprise receiving and storing 902 an identifier $ID_k$ which is associated with the second key $K_{Tk}$, and providing 905 the PEP 103 with the identifier $ID_k$. The identifier may be comprised in the request.

Embodiments of the methods 700, 800, and 900, may comprise further steps in accordance with what was described hereinbefore, in particular with reference to FIGS. 2 to 6.

Figure 10:
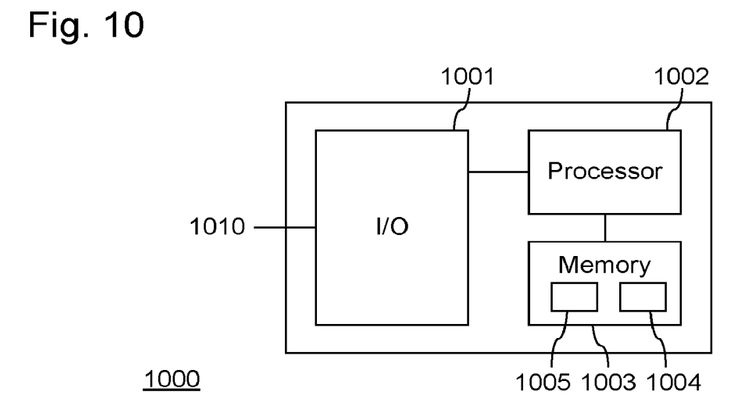
FIG. 10 shows a PEP for performing an operation on a data storage, in accordance with an embodiment of the invention.

With reference to FIG. 10, an embodiment of the PEP 103 for performing an operation on a data storage 101 for storing data is illustrated. The data stored in the data storage 101 is encrypted with a key $K^D$ associated with an owner 102 of the data. The PEP 1000 comprises a communication interface 1001, a processing means such as a processor 1002, and a memory 1003. The memory 1003 comprises instructions 1004 executable by the processor 1002. The communication interface 1001 is arranged for communicating with the other entities 1010 described with reference to FIG. 1, in particular the data storage 101, the owner 102, the TTP 104, and one or more clients 105. The communication may be effected by means of any suitable wired or wireless communication technology, e.g., Ethernet, Wireless LAN (WLAN), Global System for Mobile Communications (GSM), Universal Mobile Telecommunications System (UMTS), or Long Term Evolution (LTE). The PEP 1000 is operative to receive a request for performing the operation on the data storage 101 from a client $C_k$ 105 of one or more clients which are authorized to perform operations on the data storage 101. The PEP 1000 is further operative to acquire a first key $K_{Ck}$ from the client $C_k$ 105, acquire a second key $K_{Tk}$ from a TTP 104, derive the key $K^D$ from the first key $K_{Ck}$ and the second key $K_{Tk}$, and perform the operation on the data storage 101 using the derived key $K^D$. The PEP 1000 may further be operative to store the derived key $K^D$ in a local storage 1005, which may be comprised in the memory 1003 of the PEP 1000, for the purpose of using the key $K^D$ in performing the requested operation. Optionally, the PEP 1000 may further be operative to delete the key $K^D$ after the performing the operation on the data storage 101 is completed.

Figure 11:
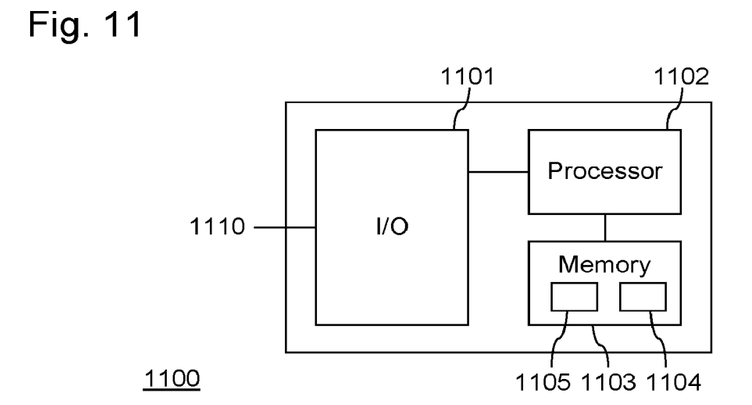
FIG. 11 shows a TTP for performing an operation on a data storage, in accordance with an embodiment of the invention.

With reference to FIG. 11, an embodiment of the TTP 104 for performing an operation on a data storage 101 for storing data is illustrated. The data stored in the data storage 101 is encrypted with a key $K^D$ associated with an owner 102 of the data. The TTP 1100 comprises a communication interface 1101, a processing means such as a processor 1102, and a memory 1103. The memory 1103 comprises instructions 1104 executable by the processor 1102. The communication interface 1101 is arranged for communicating with the other entities 1110 described with reference to FIG. 1, in particular the data storage 101, the owner 102, the PEP 103, and one or more clients 105. The communication may be effected by means of any suitable wired or wireless communication technology, e.g., Ethernet, WLAN, GSM, UMTS, or LTE. The TTP 1100 is operative to receive and store a second key $K_{Tj}$ for each client $C_j$ of one or more clients 105 which are authorized to perform operations on the data storage 101. The second key $K_{Tj}$ is derived such that the key $K^D$ can be derived from a first key $K_{Cj}$ associated with the client $C_j$ 105 and the second key $K_{Tj}$. The TTP 1100 may be operative to store the second keys in a local storage 1105, which may be comprised in the memory 1103 of the TTP 1100. The TTP 1100 is further operative to receive a request from a PEP 103 for a second key $K_{Tk}$ associated with a client $C_k$ of the one or more clients 105, the client $C_k$ 105 requesting to perform the operation on the data storage 101, and to provide the PEP 103 with the second key $K_{Tk}$.

Figure 12:
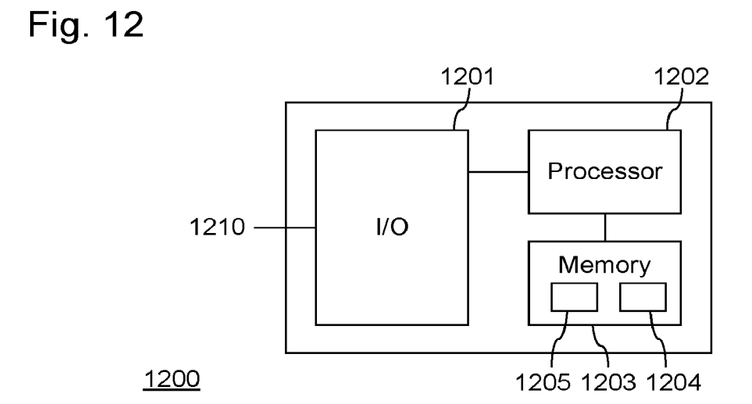
FIG. 12 shows a client device for performing an operation on a data storage, in accordance with an embodiment of the invention.

With reference to FIG. 12, an embodiment of the client 105, or client device, for performing an operation on a data storage 101 for storing data is illustrated. The data stored in the data storage 101 is encrypted with a key $K^D$ associated with an owner 102 of the data. The client 1200 comprises a communication interface 1201, a processing means such as a processor 1202, and a memory 1203. The memory 1203 comprises instructions 1204 executable by the processor 1202. The communication interface 1201 is arranged for communicating with the other entities 1210 described with reference to FIG. 1, in particular the data storage 101, the owner 102, the PEP 103, and the TTP 104. The communication may be effected by means of any suitable wired or wireless communication technology, e.g., Ethernet, WLAN, GSM, UMTS, or LTE. The client 1200 is operative to receive and store a first key $K_{Ck}$. The first key $K_{Ck}$ is derived such that the key $K^D$ can be derived from the first key $K_{Ck}$ and a second key $K_{Tk}$ associated with the client $C_k$ 105. The client 1200 may be operative to store the first key in a local storage 1205, which may be comprised in the memory 1203 of the client 1200. The client 1200 is further operative to transmit a request for performing the operation on the data storage 101 to a PEP 103 and to provide the PEP 103 with the first key $K_{Ck}$.

Embodiments of the PEP 1000, the TTP 1100, and the client 1200, may further be operative to perform in accordance with what was described hereinbefore, in particular with reference to FIGS. 2 to 6.

Even though embodiments of the PEP 103, the TTP 104, and the client 105, are hereinbefore described as being implemented by means of software, i.e., computer programs comprising instructions executable by a processor, it will be appreciated that processing means other than a processor, such as a general purpose processor, may be used. For instance, the processing means may be any suitable electronic circuitry adapted to perform in accordance with an embodiment of the invention, in particular in accordance with what is described with reference to FIGS. 2 to 6.

Figure 13:
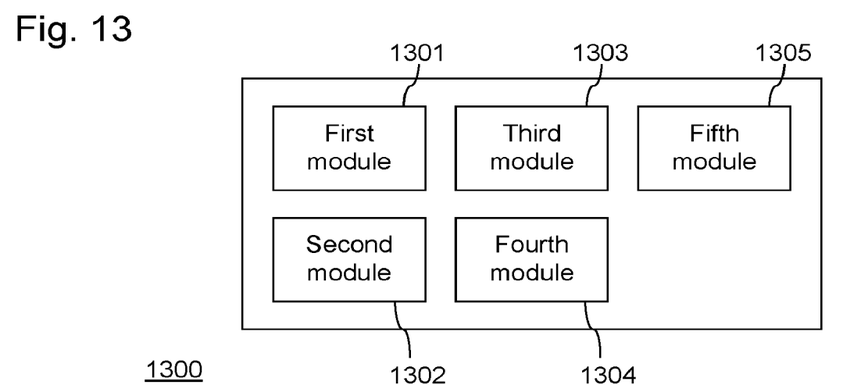
FIG. 13 shows a PEP for performing an operation on a data storage, in accordance with another embodiment of the invention.

An alternative embodiment of the PEP 103 for performing an operation on a data storage 101 for storing data 106 is illustrated in FIG. 13. The data 106 stored in the data storage 101 is encrypted with a key $K^D$ associated with an owner 102 of the data. The PEP 1300 comprises a first module 1301 configured to receive a request for performing the operation on the data storage from a client $C_k$ of one or more clients 105 which are authorized to perform operations on the data storage, a second module 1302 configured to acquire a first key $K_{Ck}$ from the client $C_k$ 105, a third module 1303 configured to acquire a second key $K_{Tk}$ from a TTP 104, a fourth module 1304 configured to derive the key $K^D$ from the first key $K_{Ck}$ and the second key $K_{Tk}$, and a fifth module 1305 configured to perform the operation on the data storage 101 using the derived key $K^D$.

Figure 14:
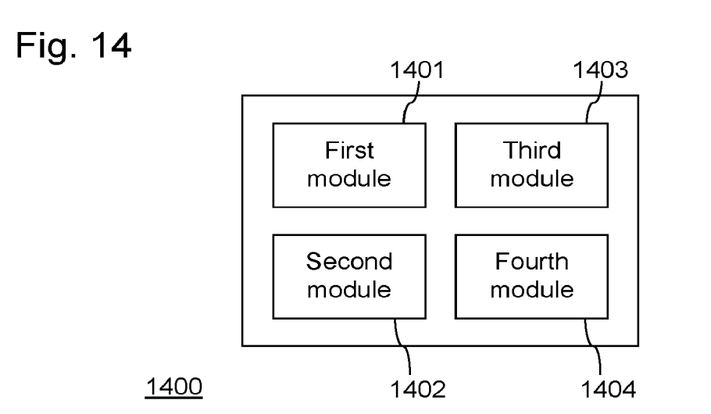
FIG. 14 shows a TTP for performing an operation on a data storage, in accordance with another embodiment of the invention.

An alternative embodiment of the TTP 104 for performing an operation on a data storage 101 for storing data 106 is illustrated in FIG. 14. The data 106 stored in the data storage 101 is encrypted with a key $K^D$ associated with an owner 102 of the data. The TTP 1400 comprises a first module 1401 configured to, for each client $C_j$ of one or more clients 105 which are authorized to perform operations on the data storage 101, receive a second key $K_{Tj}$ which is derived such that the key $K^D$ can be derived from a first key $K_{Cj}$ associated with the client $C_j$ and the second key $K_{Tj}$, a second module 1402 configured to store each received second key $K_{Tj}$, a third module 1403 configured to receive a request from a PEP 103 for a second key $K_{Tk}$ associated with a client $C_k$ of the one or more clients 105, the client $C_k$ requesting to perform the operation on the data storage, and a fourth module 1404 configured to provide the PEP 103 with the second key $K_{Tk}$.

Figure 15:
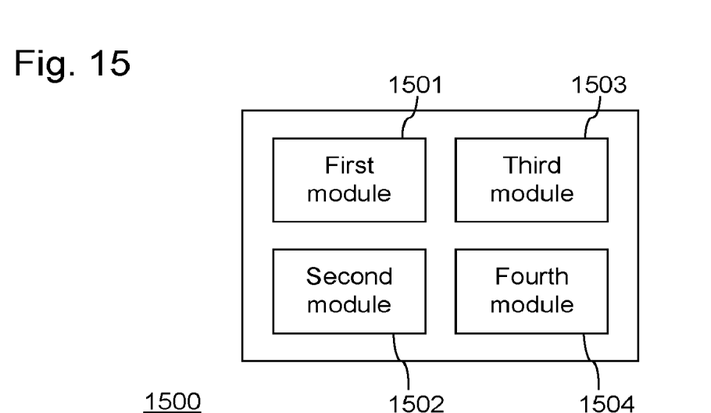
FIG. 15 shows a client device for performing an operation on a data storage, in accordance with another embodiment of the invention.

An alternative embodiment of the client 105 for performing an operation on a data storage 101 for storing data 106 is illustrated in FIG. 15. The data 106 stored in the data storage 101 is encrypted with a key $K^D$ associated with an owner 102 of the data. The client 1500 comprises a first module 1501 configured to receive a first key $K_{Ck}$ which is derived such that the key $K^D$ can be derived from the first key $K_{Ck}$ and a second key $K_{Tk}$ associated with the client $C_k$, a second module 1502 configured to store the first key $K_{Ck}$, a third module 1503 configured to transmit a request for performing the operation on the data storage to a PEP 103, and a fourth module 1504 configured to provide the PEP 103 with the first key $K_{Ck}$.

Embodiments of the PEP 1300, the TTP 1400, and the client 1500, may comprise further modules being configured to perform in accordance with what was described hereinbefore, in particular with reference to FIGS. 2 to 6.

The modules comprised in the PEP 1300, the TTP 1400, and the client 1500, may be implemented by means of hardware, i.e., electronic circuitry, or a combination of hardware and software. For instance, the modules may be implemented using processing means, such as the processors (1002, 1102, and 1202), and, optionally, the memories (1003, 1103, and 1203), described with reference to FIGS. 10 to 12.

With respect to the present disclosure, a processor may be a general purpose processor or any kind of processing means capable of executing instructions. Further, a memory may be a Random Access Memory (RAM), a Read Only Memory (ROM), a hard disk, a flash memory, or the like. A storage medium may, e.g., be a RAM, a ROM, a flash memory, a hard disk, a CD-ROM, a DVD, a Blu-ray disc, or the like. It will also be appreciated that an embodiment of the computer programs may be carried by an electronic signal, an optical signal, or a radio signal.

The person skilled in the art realizes that the invention by no means is limited to the embodiments described above. On the contrary, many modifications and variations are possible within the scope of the appended claims.

The invention claimed is:

1. A method of performing an operation on a data storage for storing data being encrypted with a key $K^D$ associated with an owner of the data, the method being performed by a client $C_k$, the method comprising:
   receiving a first key $K_{Ck}$, wherein the key $K^D$ is derived from the first key $K_{Ck}$ and a second key $K_{Tk}$ associated with the client $C_k$, storing the first key $K_{Ck}$,
   receiving an identifier $I_{Dk}$ which is associated with the second key $K_{Tk}$, storing the identifier $I_{Dk}$,
   wherein for the client $C_k$, wherein for the client $C_k$, the key $K^D$ is derived as $K^D = K_{ck}$ XOR $K_{tk}$, the second key $K_{tk}$ is derived randomly and the first key $K_{ck}$ is derived from the second key $K_{tk}$;
   transmitting a request for performing the operation on the data storage to a Policy Enforcement Point, PEP,
   providing the PEP with the first key $K_{Ck}$, and
   providing the PEP with the identifier $I_{Dk}$.

2. The method according to claim 1, wherein the request for performing the operation on the data storage relates to retrieving data stored in the data storage.

3. The method according to claim 2, wherein the request for performing the operation on the data storage comprises information identifying the requested data.

4. The method according to claim 1, wherein the request for performing the operation on the data storage relates to storing data in the data storage.

5. The method according to claim 4, wherein the request for performing the operation on the data storage comprises the data to be stored.

6. A client $C_k$ for performing an operation on a data storage for storing data being encrypted with a key $K^D$ associated with an owner of the data, the client comprising at least one processor adapted to:
   receive a first key $K_{Ck}$, wherein the key $K^D$ is derived from the first key $K_{Ck}$ and a second key $K_{Tk}$ associated with the client $C_k$, store the first key $K_{Ck}$,
   receive an identifier $I_{Dk}$ which is associated with the second key $K_{Tk}$, store the identifier $I_{Dk}$,
   wherein for the client $C_k$, wherein for the client $C_k$, the key $K^D$ is derived as $K^D = K_{ck}$ XOR $K_{tk}$, the second key $K_{tk}$ is derived randomly and the first key $K_{ck}$ is derived from the second key $K_{tk}$;
   transmit a request for performing the operation on the data storage to a Policy Enforcement Point, PEP, and
   provide the PEP with the first key $K_{Ck}$, and
   provide the PEP with the identifier $I_{Dk}$.

7. The client according to claim 6, wherein the request for performing the operation on the data storage relates to retrieving data stored in the data storage.

8. The client according to claim 7, wherein the request for performing the operation on the data storage comprises information identifying the requested data.

9. The client according to claim 6, wherein the request for performing the operation on the data storage relates to storing data in the data storage.

10. The client according to claim 9, wherein the request for performing the operation on the data storage comprises the data to be stored.

11. A client according to claim 6, being one of a computer, a mobile phone, a smartphone, a User Equipment, a tablet computer and a digital camera.

* * * * *